(12) United States Patent
Nguyen et al.

(10) Patent No.: US 10,364,660 B2
(45) Date of Patent: Jul. 30, 2019

(54) PROPPANT-FREE CHANNELS IN A PROPPED FRACTURE USING ULTRA-LOW DENSITY, DEGRADABLE PARTICULATES

(71) Applicant: Halliburton Energy Services, Inc., Houston, TX (US)

(72) Inventors: Philip D. Nguyen, Houston, TX (US); Loan K. Vo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/074,738

(22) PCT Filed: Jun. 23, 2016

(86) PCT No.: PCT/US2016/038955
§ 371 (c)(1),
(2) Date: Aug. 1, 2018

(87) PCT Pub. No.: WO2017/222527
PCT Pub. Date: Dec. 28, 2017

(65) Prior Publication Data
US 2019/0040728 A1    Feb. 7, 2019

(51) Int. Cl.
*E21B 43/267* (2006.01)
*C09K 8/68* (2006.01)
(Continued)

(52) U.S. Cl.
CPC ............ *E21B 43/267* (2013.01); *C09K 8/685* (2013.01); *C09K 8/805* (2013.01); *C09K 8/88* (2013.01); *C09K 8/887* (2013.01)

(58) Field of Classification Search
CPC ....... E21B 43/26; E21B 43/267; C09K 8/685; C09K 8/805; C09K 8/887
See application file for complete search history.

(56) References Cited

U.S. PATENT DOCUMENTS 7,044,220 B2    5/2006  Nguyen et al.
7,255,169 B2    8/2007  van Batenburg et al.
(Continued)

FOREIGN PATENT DOCUMENTS

WO    WO-2015/105488 A1    7/2015
WO    WO-2016/036363 A1    3/2016

OTHER PUBLICATIONS

International Search Report and Written Opinion from PCT/US2016/038955, dated Jun. 23, 2016, 10 pages.

*Primary Examiner* — Zakiya W Bates
*Assistant Examiner* — Crystal J Miller
(74) *Attorney, Agent, or Firm* — McGuireWoods LLP

(57) ABSTRACT

Method comprising introducing a proppant-free fluid into a wellbore penetrating a subterranean formation to create or enhance one or more fractures; providing binding agent-coated proppant comprising proppant coated with a binding agent; and introducing, in alternating order, a proppant-laden fluid and a spacer fluid into one or more of the fractures. The proppant-laden fluid comprises a base fluid and binding agent-coated proppant, and the spacer fluid comprises a base fluid and degradable ultra-low density particulates. And forming a proppant pack in the fracture, wherein the proppant pack comprises binding agent-coated proppant and degradable ultra-low density particulates; producing hydrocarbons through the proppant pack; wherein the hydrocarbons degrade the degradable ultra-low density particulates to leave behind particulate-free channels.

18 Claims, 1 Drawing Sheet

(51) Int. Cl.
*C09K 8/80* (2006.01)
*C09K 8/88* (2006.01)

(56) References Cited

U.S. PATENT DOCUMENTS

| | | | |
|---|---|---|---|
| 7,322,411 B2 | 1/2008 | Brannon et al. | |
| 7,426,961 B2 | 9/2008 | Stephenson et al. | |
| 7,472,751 B2 * | 1/2009 | Brannon | C09K 8/62 |
| | | | 166/280.1 |
| 7,772,163 B1 | 8/2010 | Brannon et al. | |
| 7,845,409 B2 * | 12/2010 | Shinbach | E21B 43/267 |
| | | | 166/280.2 |
| 8,327,940 B2 * | 12/2012 | Boronin | E21B 43/267 |
| | | | 166/308.1 |
| 8,448,706 B2 | 5/2013 | Hughes et al. | |
| 8,657,002 B2 | 2/2014 | Willberg et al. | |
| 8,727,003 B2 * | 5/2014 | Li | C04B 33/13 |
| | | | 166/280.2 |
| 8,757,259 B2 | 6/2014 | Lesko et al. | |
| 8,776,882 B2 | 7/2014 | Shindgikar et al. | |
| 8,960,284 B2 | 2/2015 | Nguyen et al. | |
| 8,973,659 B2 | 3/2015 | Karadkar et al. | |
| 8,997,868 B2 | 4/2015 | Nguyen et al. | |
| 9,140,107 B2 | 9/2015 | Abad et al. | |
| 9,260,650 B2 | 2/2016 | Nguyen et al. | |
| 9,938,810 B2 * | 4/2018 | Nguyen | C09K 8/72 |
| 10,030,495 B2 * | 7/2018 | Litvinets | C09K 8/665 |
| 2007/0144736 A1 * | 6/2007 | Shinbach | C09K 8/80 |
| | | | 166/250.1 |
| 2008/0032898 A1 * | 2/2008 | Brannon | C09K 8/62 |
| | | | 507/100 |
| 2011/0000667 A1 * | 1/2011 | Brannon | C09K 8/80 |
| | | | 166/280.2 |
| 2011/0083849 A1 | 4/2011 | Medvedev et al. | |
| 2011/0265998 A1 * | 11/2011 | Boronin | E21B 43/267 |
| | | | 166/308.1 |
| 2012/0118574 A1 * | 5/2012 | Li | C04B 33/13 |
| | | | 166/308.1 |
| 2014/0060826 A1 * | 3/2014 | Nguyen | E21B 43/267 |
| | | | 166/280.1 |
| 2014/0060828 A1 | 3/2014 | Nguyen et al. | |
| 2014/0116698 A1 | 5/2014 | Tang et al. | |
| 2014/0144629 A1 | 5/2014 | Nguyen | |
| 2015/0083420 A1 * | 3/2015 | Gupta | E21B 43/267 |
| | | | 166/280.2 |
| 2015/0167443 A1 * | 6/2015 | Litvinets | C09K 8/665 |
| | | | 166/280.1 |
| 2016/0076352 A1 * | 3/2016 | Nguyen | C09K 8/72 |
| | | | 166/280.1 |

\* cited by examiner

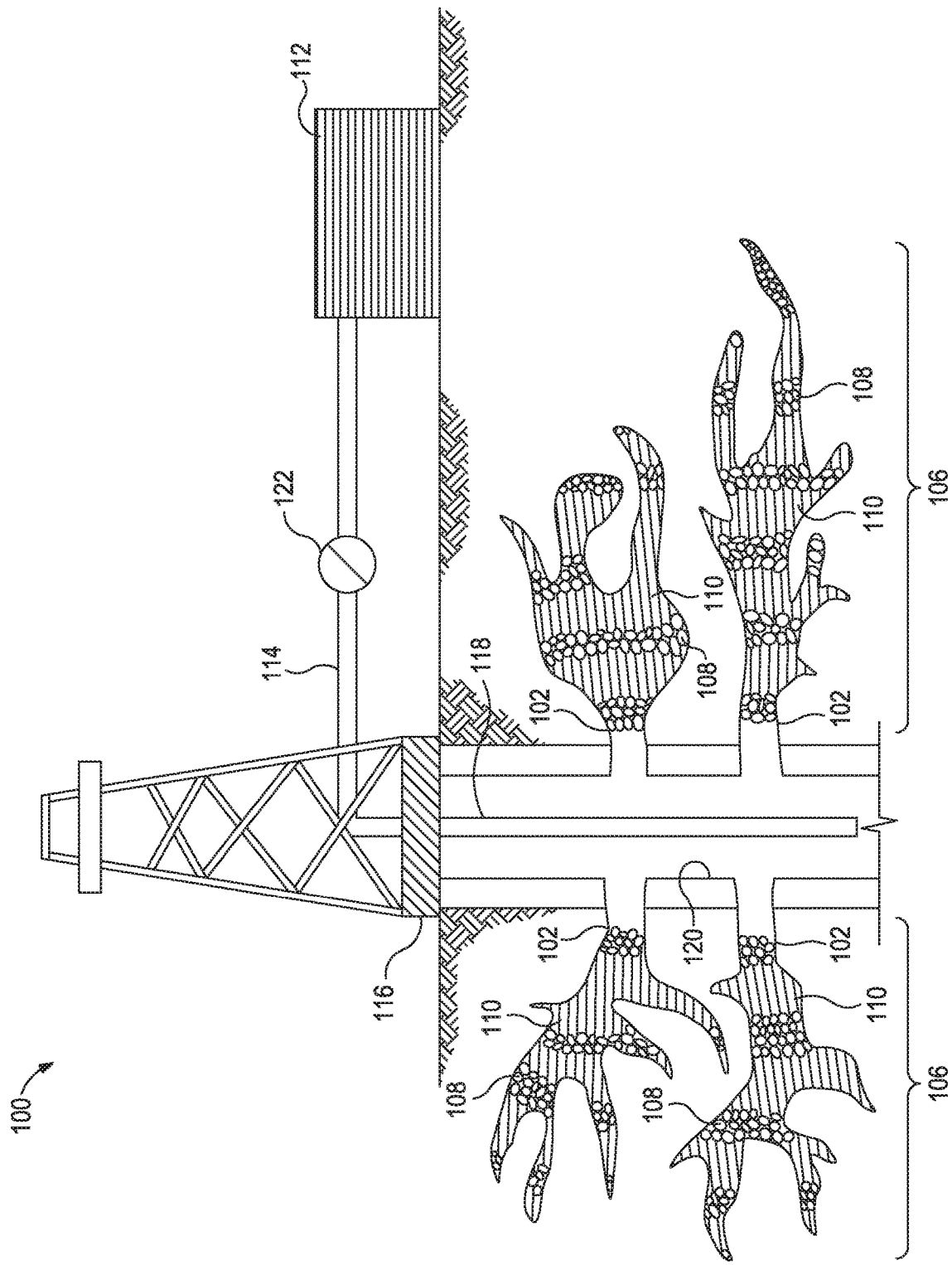

PROPPANT-FREE CHANNELS IN A PROPPED FRACTURE USING ULTRA-LOW DENSITY, DEGRADABLE PARTICULATES

BACKGROUND

The embodiments herein relate generally to forming proppant-free channels in a proppant packs in subterranean formations using alternating addition of ultra-low density, degradable particulates.

Hydrocarbon producing wells (e.g., oil producing wells, gas producing wells, and the like) are often stimulated by hydraulic fracturing treatments. In traditional hydraulic fracturing treatments, a fracturing fluid is pumped into a portion of a subterranean formation (which may also be referred to herein simply as a "formation") above a fracture gradient sufficient to break down the formation and create one or more fractures therein. As used herein, the term "fracture gradient" refers to a pressure necessary to create or enhance at least one fracture in a particular subterranean formation location, increasing pressure within a formation may be achieved by placing fluid therein at a high flow rate to increase the pressure on the formation. Then, following the initiation of the fracture, one or more treatment fluids are placed into the formation while the fracture is held open. The term "treatment fluid," as used herein, refers generally to any fluid that may be used in a subterranean application in conjunction with a desired function and/or for a desired purpose. The term "treatment fluid" does not imply any particular action by the fluid or any particular component thereof. By way of non-limiting example, a "treatment fluid" may be an acidizing fluid, a fracture-initiating fluid, a proppant-laden fluid, etc. Often, a treatment fluid laden with proppant, known as a carrier fluid, is placed into the formation following the fracture fluid. The carrier fluid carries the proppant into the fracture that was formed and then, once the pressure is released, the proppants remain in the fracture where they act to hold apart ("prop") the walls of the fracture once the pressure is released.

When the fracturing pressure is released, the fracture walls are held apart and not allowed to close by the action of the proppant, and the pressure of the closing helps the proppant hold together as a cohesive proppant bed. Often, proppant is selected to be spherical or substantially spherical, such that the proppant bed retains interconnected interstitial spaces between the proppant particulates that allow flow of fluids through the proppant bed. The greater the volume of space between the proppant grains, either interstitial or otherwise, the greater the conductivity of the resulting proppant pack.

BRIEF DESCRIPTION OF THE DRAWINGS

The following FIGURES are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 shows an illustrative schematic of a system that can deliver proppant-laden fluids and spacer-fluid to fractures in a subterranean formation, according to one or more embodiments.

DETAILED DESCRIPTION

The embodiments herein relate generally to forming proppant-free channels in proppant packs in subterranean formations using alternating addition of ultra-low density, degradable particulates.

In some embodiments of the present invention a method of forming proppant-free channels is provided that includes the use of a proppant-free fracturing fluid to form a fracture within a subterranean formation, followed by the alternating addition of a proppant-laden fluid and a spacer fluid, wherein the spacer fluid comprises degradable, ultra-low density particles Once the proppant-laden fluid additions and the spacer fluid additions have been placed, the pressure on the fracture is released and it is allowed to close, thereby forming a proppant pack from the proppant placed into the fracture. As fluid from the formation reservoir is then allowed to flow through the proppant pack, the degradable particulates degrade and the spacer fluid is displaced, increasing the conductivity of the propped fracture. As used herein the term "conductivity" when used in reference to a propped fracture refers to the ability of the fracture to flow or transmit formation fluids through the propped fracture.

As used herein the term "proppant" (or "proppant particulates") refers to solid particulates that are placed into a subterranean fracture and that are not subject to significant degradation in the downhole environment. The term "not subject to significant degradation" refers to "solid particulates that retain sufficient physical integrity to prop a fracture over the life of the producing fracture and that are not subject to degradation in the presence of reservoir fluids. By contrast, for degradable particulates discussed hereinafter, the term "degradable" refers to a material that completely degrades (no solid portion remaining) over a period of time ranging from a day to 2 weeks after production of liquid hydrocarbons through the proppant bed has begun. Suitable materials for these particulates include, but are not limited to, sand, bauxite, ceramic materials, glass materials, polymer materials, polytetrafluoroethylene materials, nut shell pieces, composite particulates comprising a binder and a filler material, and combinations thereof. Composite particulate proppants may comprise a binder such as a polymer (which may be a co-polymer, ter-polymer, or a higher-level polymer), a hardenable resin, or a combination thereof. Composite particulate proppants may comprise a filler material such as silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The mean particulate size of proppants suitable for use in embodiments of the present invention generally may range from about 6 mesh (3.4 mm) to about 400 mesh (0.04 mm) or less on the U.S. Sieve Series; however, in certain circumstances, other sizes or mixtures of sizes may be desired and will be entirely suitable for practice of the embodiments described herein. In particular embodiments, preferred mean particulates size distribution ranges are one or more of 6/12 mesh (3.4 mm/1.7 mm), 8/16 mesh (2.4 mm/1.2 mm), 12/20 mesh (1.7 mm/0.84 mm), 16/30 mesh (1.2 mm/0.56 mm), 20/40 mesh (0.84 mm/0.4 mm), 30/50 mesh (0.60 mm/0.30 mm), 40/60 mesh (0.4 mm/0.25 mm), 40/70 mesh (0.40 mm/0.21 mm), or 50/70 mesh (0.30 mm/0.21 mm). It should be understood that while spherical proppant is often desirable, the term "proppant," as used in this disclosure, includes all known shapes of materials, including substantially spherical, oblong, oval, rod, fibrous, polygonal materials (such as cubic or pyramidal materials), platelet, chip, shaving, and combinations thereof. In particular, it may be desirable to add fibrous materials to add strength and cohesion to a proppant pack and that may or may not aid in bearing the pressure of a closed fracture. In some embodiments, proppants (e.g., one or more types of proppant particulates) may be present in a proppant-laden fluid in an amount in the range of from about 0.5 pounds per gallon ("ppg") to about 30 ppg by volume of the proppant-laden fluid, including subsets therebetween (e.g., about 0.5 ppg to about 10 ppg, about 1 ppg to about 30 ppg, about 5 ppg to about 20 ppg, or about 10 ppg to about 30 ppg).

As used herein, the term "proppant-laden" refers to fluids that comprise proppant. As used herein, the term "proppant-free" is used to describe fluids and channels that are substantially free of proppant (e.g., less than 1 wt % of the proppant that the corresponding proppant-laden fluid). For example, when proppant-laden fluid includes 10 wt % proppant, a proppant-free fluid may include less than 0.1 wt % proppant.

FIG. 1 shows an illustrative schematic of a system 100 that can deliver proppant-free, proppant-laden fluids, and spacer fluids (described further below) to fractures 102 in a subterranean formation 104, according to one or more embodiments, to form a proppant pack 106 therein that includes proppant-laden sections 108 and spacer fluid sections 110. It should be noted that FIG. 1 shows stylized sections of proppant-laden sections 108 and spacer fluid sections 110 to graphically illustrate placement, in practice, proppant-laden sections 108 and spacer fluid sections 110 would be placed considerably closer together and the total number of each of the sections would be greater than shown.

To form the proppant pack 106, the proppant-laden fluids and the spacer fluids are introduced into the fractures 102 in alternating order.

It should be noted that while FIG. 1 generally depicts a land-based system, it is to be recognized that like systems may be operated in subsea locations as well. As depicted in FIG. 1, system 100 may include one or more mixing tanks 112, in which the proppant-free, proppant-laden fluids, and spacer fluids may be formulated. In other embodiments, however, the proppant-free, proppant-laden fluids, and spacer fluids may be formulated offsite and transported to a worksite.

The fluids (proppant-free, proppant-laden, and spacer) may be conveyed via line 114 to wellhead 116 and enter a tubular 118 extending from wellhead 116 into subterranean formation 104. Upon being ejected from tubular 118, the fluids may subsequently penetrate into fractures 102 in the subterranean formation 18 to form and fill the proppant pack 106. In some instances, tubular 118 may have a plurality of orifices (not shown) through which the fluids may enter the wellbore 120 proximal to a portion of the subterranean formation 104 to be fractured/propped. In some instances, the wellbore 120 may further comprise equipment or tools (not shown) for zonal isolation of a portion of the subterranean formation 104 to be treated.

Pump 122 may be configured to raise the pressure of the fluids to a desired degree before introduction into tubular 118, whether the fluids are provided from the mixing tanks 112 or other vessel (e.g., a truck, a railcar, a barge, or the like). It is to be recognized that system 100 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like. Further, FIG. 1 may be modified with suitable valves (before or after the pump 122) to appropriately alternate the desired fluid flows.

The pump 122 may be a high-pressure pump in some embodiments. As used herein, the term "high-pressure pump" will refer to a pump that is capable of delivering a fluid downhole at a pressure of 1000 psi or greater. A high-pressure pump may be used when it is desired to introduce the fluids to a subterranean formation at or above a fracture gradient of the subterranean formation, but it may also be used in cases where fracturing is not desired. In some embodiments, the high-pressure pump may be capable of fluidly conveying particulate matter, such as proppant, into the subterranean formation. Suitable high-pressure pumps will be known to one having ordinary skill in the art and may include, but are not limited to, floating piston pumps and positive displacement pumps.

In other embodiments, the pump 122 may be a low-pressure pump. As used herein, the term "low-pressure pump" will refer to a pump that operates at a pressure of less than 1000 psi. In some embodiments, a low-pressure pump may be fluidly coupled to a high-pressure pump that is fluidly coupled to the tubular. That is, in such embodiments, the low-pressure pump may be configured to convey the fluids to the high-pressure pump. In such embodiments, the low-pressure pump may "step up" the pressure of the fluids before it reaches the high-pressure pump.

As noted above, in some embodiments of the present invention, a proppant-free fluid is first placed into a subterranean formation in order to create or enhance at least one fracture therein. Generally, this proppant free fluid comprises a base fluid, and may further comprise one or more gelling agents, or one or more gelling agents along with the crosslinking agent.

Once the fracture is formed the pressure is maintained to hold the fracture open while a proppant-laden fluid and a spacer fluid are placed into the subterranean formation in alternating portions. That is, a portion of the proppant-laden fluid is placed, followed by a portion of the spacer fluid, followed by another portion of the proppant-laden fluid, followed by another portion of the spacer fluid, etc. It will be understood by one of skill in the art that the invention could just as well be practiced by placing the spacer fluid first, followed by the proppant-laden fluid, etc. In some embodiments, the placement of the proppant-laden fluid and the spacer fluid is performed using 30 to 50 stages each of proppant-laden fluid and the spacer fluid, with each stage representing 15-second addition of proppant-laden fluid and a 15-second addition of spacer fluid. In such embodiments, the volume of the proppant-laden fluid and the spacer fluid is similar, with each stage of proppant-laden fluid followed by a similar volume of spacer fluid. In other embodiments, the volume of proppant-laden fluid may be greater than the volume of spacer fluid, such as the total volume of the proppant-laden fluid being about 150% to 300% times greater than the volume of spacer fluid. Embodiments wherein higher amounts of proppant-laden fluid may be desirable are, for example, in situations where the fracture closure pressure is relatively high. In other embodiments, the volume of proppant-laden fluid may be smaller than the volume of spacer fluid, such as the total volume of the proppant-laden fluid being about 75% to 50% times smaller than the volume of spacer fluid. Embodiments wherein smaller amounts of proppant-laden fluid may be desirable are, for example, in situations where the fracture closure pressure is relatively low.

In some embodiments of the present invention, the proppant-laden fluid comprises a base fluid and proppant that is coated with a binding agent. In other embodiments of the present invention the proppant-laden fluid comprises a base fluid, proppant is coated with a binding agent, and non-degradable ultra-low density particulates.

In some embodiments of the present invention, the spacer fluid comprises a based fluid and degradable, ultra-low density particulates.

As noted above, the proppants suitable for use in the present invention may be spherical, or substantially any other shape. Moreover, the non-degradable ultra-low density particulates and/or the degradable low-density particulates may similarly be spherical, or substantially any other shape. Such other shapes include all known shapes of materials, including substantially spherical, oblong, oval, rod, fibrous, polygonal materials (such as cubic or pyramidal materials), platelet, chip, shaving, and combinations thereof.

Because the proppant-laden fluids and the proppant-free fluids are introduced in alternating order, the proppant pack 106 includes proppant sections 108 and degradable, ultra-low density particle sections 110. When the fracturing pressure is released, the proppant-laden sections 108 will act to keep the fracture 100 with some limited aid from the degradable, ultra-low density particle sections 110. As the fractured portion of the formation is put into production, produced hydrocarbons (such as oil and gas) will flow through the proppant pack and interact with the proppant and degradable, ultra-low density particles therein. The degradable, ultra-low density particles suitable for use in the present invention are susceptible to degradation in the presence of hydrocarbons and thus will be degraded as production continues, leaving behind particle-free channels in the space where the degradable, ultra-low density particles 110 had been. Meanwhile, the binding agent on the proppant placed in the proppant-laden fluid will ensure that the proppant sections 108 retain enough integrity to hold the fracture open, then creating enhance fluid flow through the proppant pack 106 and, consequently, increase hydrocarbon production from the formation 104.

It is also to be recognized that the disclosed proppant-free, proppant-laden, and spacer fluids may also directly or indirectly affect the various downhole equipment and tools that may come into contact with the proppant-laden and proppant-free fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Exemplary base fluids that may be used in the proppant-free, the proppant-laden fluid, and the spacer fluid include, but are not limited to, aqueous-based fluids, aqueous-miscible fluids, oil-based fluids, water-in-oil emulsions, or oil-in-water emulsions. Suitable oil-based fluids may include alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater (e.g., water containing one or more salts dissolved therein), brine (e.g., saturated salt water), seawater, naturally-occurring brine, produced water, chloride-based brines, bromide-based brines, formate-based brines, and any combination thereof. Suitable aqueous-miscible fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. It should be noted that for water-in-oil and oil-in-water emulsions, any mixture of the above may be used including the water being and/or comprising an aqueous-miscible fluid.

The base fluids in each of the proppant-free fluid, the proppant-laden fluid, and the spacer fluid and the may be the same or different.

As noted above, in some embodiments, the proppant-free fluid may comprise one or more gelling agents and or crosslinking agents. Similarly, the proppant-laden fluid may also comprise one or more gelling agents and/or crosslinking agents. The presence of gelling and/or crosslinking agents, can increase the proppant-laden fluid's ability to transport proppant into the formation. While some embodiments of the present invention may further include a spacer fluid comprising one or more gelling agents and/or crosslinking agents, and preferred embodiments no gelling agents or crosslinking agents are used in the spacer fluid. In each of the proppant-free, proppant-laden, or spacer fluid, the gelling agent may be replaced with a viscoelastic surfactant-based fluid.

Whether used in the proppant-free fluid, proppant-laden fluid, or spacer fluid, gelling agents suitable for use in the embodiments of the present invention may comprise any substance (e.g. a polymeric material) capable of increasing the viscosity of the treatment fluid. In certain embodiments, the gelling agent may comprise one or more polymers that have at least two molecules that are capable of forming a crosslink in a crosslinking reaction in the presence of a crosslinking agent, and/or polymers that have at least two molecules that are so crosslinked (i.e., a crosslinked gelling agent). The gelling agents may be naturally-occurring gelling agents, synthetic gelling agents, or a combination thereof. Suitable gelling agents include, but are not limited to, polysaccharides, biopolymers, and/or derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, succinoglycan, diutan, and combinations thereof.

Suitable synthetic polymers include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamido- and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, and derivatives and combinations thereof. In certain embodiments, the gelling agent comprises an acrylamide/2-(methacryloyloxy)ethyltrimethylammonium methyl sulfate copolymer. In certain embodiments, the gelling agent may comprise an acrylamide/2-(methacryloyloxy)ethyltrimethylammonium chloride copolymer. In certain embodiments, the gelling agent may comprise a derivatized cellulose that comprises cellulose grafted with an allyl or a vinyl monomer.

The gelling agent may be present in the treatment fluids useful in the methods of the embodiments of the present invention in an amount sufficient to provide the desired viscosity. In some embodiments, the gelling agents (i.e., the polymeric material) may be present in an amount in the range of from about 0.1% to about 10% by weight of the treatment fluid. In certain embodiments, the gelling agents may be present in an amount in the range of from about 0.15% to about 2.5% by weight of the treatment fluid.

Whether used in the proppant-free fluid, proppant-laden fluid, or spacer fluid, crosslinking agents may comprise a borate ion, a metal ion, or similar component that is capable of crosslinking at least two molecules of the gelling agent. Examples of suitable crosslinking agents include, but are not limited to, borate ions, magnesium ions, zirconium IV ions, titanium IV ions, aluminum ions, antimony ions, chromium ions, iron ions, copper ions, magnesium ions, and zinc ions. These ions may be provided by providing any compound that is capable of producing one or more of these ions. Examples of such compounds include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and combinations thereof. In certain embodiments of the present invention, the crosslinking agent may be formulated to remain inactive until it is "activated" by, among other things, certain conditions in the fluid (e.g., pH, temperature, etc.) and/or interaction with some other substance. In some embodiments, the activation of the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The choice of a particular crosslinking agent will be governed by several considerations that will be recognized by one skilled in the art, including but not limited to the following: the type of gelling agent included, the molecular weight of the gelling agent(s), the conditions in the subterranean formation being treated, the safety handling requirements, the pH of the treatment fluid, temperature, and/or the desired delay for the crosslinking agent to crosslink the gelling agent molecules.

When included, suitable crosslinking agents may be present in the treatment fluids useful in the methods of the present invention in an amount sufficient to provide the desired degree of crosslinking between molecules of the gelling agent. In certain embodiments, the crosslinking agent may be present in the first treatment fluids and/or second treatment fluids of the embodiments of the present invention in an amount in the range of from about 0.005% to about 1% by weight of the treatment fluid. In certain embodiments, the crosslinking agent may be present in the treatment fluids of the embodiments of the present invention in an amount in the range of from about 0.05% to about 1% by weight of the first treatment fluid and/or second treatment fluid. One of ordinary skill in the art, with the benefit of this disclosure, will recognize the appropriate amount of crosslinking agent to include in a treatment fluid of the embodiments of the present invention based on, among other things, the temperature conditions of a particular application, the type of gelling agents used, the molecular weight of the gelling agents, the desired degree of viscosification, and/or the pH of the treatment fluid.

Where a viscoelastic surfactant is used, the viscoelastic surfactants may generally comprise any viscoelastic surfactant known in the art, or any combination thereof. As used herein, the term "viscoelastic surfactant" refers to surfactants that impart or are capable of imparting viscoelastic behavior to a fluid due, at least in part, to the association of surfactant molecules to form viscosifying micelles. As used herein, the term "viscosifying micelle" includes structures that minimize the contact between the lyophobic ("solvent-repelling") portion of a surfactant molecule and the solvent that, under certain conditions (e.g., concentration, ionic strength of the fluid, etc.) are capable of, inter alia, imparting increased viscosity to a particular fluid and/or forming a gel.

These viscoelastic surfactants may be cationic, anionic, nonionic, amphoteric, or zwitterionic in nature. The viscoelastic surfactants may comprise any number of different compounds, including methyl ester sulfonates. In addition to methyl ester sulfonates, the viscoelastic surfactants may comprise, for example, hydrolyzed keratin. Still other useful viscoelastic surfactants may comprise: sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and combinations thereof. The term "derivative" is defined herein any compound that is made from one of the listed compounds, for example, by replacing one atom in one of the listed compounds with another atom or group of atoms, ionizing one of the listed compounds, or creating a salt of one of the listed compounds.

Examples of commercially-available viscoelastic surfactants suitable for use in the embodiments of the present invention may include, but are not limited to, Mirataine BET-O 30™ (an oleamidopropyl betaine surfactant available from Rhodia Inc., Cranbury, N.J.), Aromox APA-T (amine oxide surfactant available from Akzo Nobel Chemicals, Chicago, Ill.), Ethoquad O/12 PG (fatty amine ethoxylate quat surfactant available from Akzo Nobel Chemicals, Chicago, Ill.), Ethomeen T/12™ (a fatty amine ethoxylate surfactant available from Akzo Nobel Chemicals, Chicago, Ill.), Ethomeen S/12™ (a fatty amine ethoxylate surfactant available from Akzo Nobel Chemicals, Chicago, Ill.), and Rewoteric AM TEG™ (a tallow dihydroxyethyl betaine amphoteric surfactant available from Degussa Corp., Parsippany, N.J.).

The viscoelastic surfactant should be present in the fluid to be viscosified in an amount sufficient to impart the desired viscosity (e.g., sufficient viscosity to divert flow, reduce fluid loss, suspend particulates, etc.) to the fluid. In certain embodiments, the viscoelastic surfactant may be present in the fluid in an amount in the range of from about 0.1% to about 20% by weight of the fluid. In certain embodiments, the viscoelastic surfactant may be present in an amount in the range of from about 1% to about 10% by weight of the fluid. In certain embodiments, the viscoelastic surfactant may be present in an amount of about 7% by weight of the fluid Binding agents suitable for use in coating the proppant in the proppant-laden fluid are to consolidate proppant bed and mitigate migration of proppant particulates into the proppant-free channels or out into the wellbore. Exemplary binding agents may include, but are not limited to, non-aqueous tackifying agents, aqueous tackifying agents, silyl-modified polyamides, hardenable resins, cements, and the like, and any combination thereof. As used herein, "tackifying agents" refer to polymers and resins that are non-hardening (i.e., tacky) at downhole temperatures and pressures. As used herein, "hardenable resins" refer to polymers and resins that harden (i.e., are not tacky) at downhole temperatures and pressures. In some instances, hardenable resins may be tacky when introduced into the wellbore and then harden at downhole temperatures and pressures. When included in a proppant-laden fluid the binding agents may be present in an amount ranging from about 0.01% to about 20% by weight of the oil-external emulsion, including subsets therebetween (e.g., about 1% to about 10%, about 0.1% to about 5%, about 1% to about 20%, or about 5% to about 20%).

Non-degradable ultra-low density particulates suitable for potential inclusion in the proppant-laden fluids of the present invention include materials having a density of about 0.5 g/cc or less. Materials suitable for use as non-degradable ultra-low density particulates in embodiments of the present invention include cork (having a density of about 0.35 g/cc), foamed particulates, non-degradable polymer particulates, or composite non-degradable particulates that comprise micro-bubble beads or glass bubbles. The cork may be formed directly from cork bark or from irregular or discarded cork that has been ground to the appropriate particle size for use in the propped fracture. In some embodiments, the non-degradable ultra-low density particulates have a particle size ranging from about 20% to about 500% of the average proppant size used. Moreover, in some embodiments the non-degradable ultra-low density particulates may be present in the proppant-laden fluid in an amount ranging from about 0.5% to 5% by weight of the proppant. In the embodiments wherein non-degradable ultra-low density particulates are used, the proppant-laden fluid may be able to suspend the proppant within the fluid while needing fewer gelling agents and/or fewer crosslinking agents, thereby lowering treatment costs for materials and energy.

Degradable ultra-low density particulates suitable for potential inclusion in the spacer fluids of the present invention include materials having a density of about 0.1 g/cc or less. Materials suitable for use as degradable ultra-low density particulates in embodiments of the present invention include expanded polystyrene particulates (having a density of about 0.05 g/cc), polyacrylic particulates, polyamide particulates, polyolefin particulates (e.g., polyethylene, polypropylene, polyisobutylene), and combinations thereof. The material listed above must be polymerized to yield the physical properties (molecular weight, expanded or unexpanded, etc.) such that the material completely degrades (no solid portion remaining) over a period of time ranging from a day to 2 weeks after production of liquid hydrocarbons through the proppant bed has begun. Expanded polystyrene is readily commercially available in sizes ranging from about 0.3-0.8 mm in diameter. In some embodiments, the degradable ultra-low density particulates have a particle size ranging from about 20% to about 500% of the average proppant size used in the proppant-laden fluid. Moreover, in some embodiments the degradable ultra-low density particulates may be present in the spacer fluid in an amount ranging from about 1% to 10% by weight of the base fluid in the spacer fluid.

In other embodiments of the present invention, the proppant-free fluid, the proppant-laden fluid, or the spacer fluid may further comprise a fibrous material. The fibrous material may be degradable fibers, substantially non-self-degradable fibers, or substantially non-degradable fibers. In some examples, the fiber can be degradable, and the degradability of the fiber can be self-degradability (e.g., degrades as a result of the influence of elements naturally present in the downhole formation over a suitable period of time), or can be inducible degradability (e.g., triggerable, such as by at least one of allowing time to pass, heating, vibrating, changing surrounding pH, changing surrounding salinity, and changing the chemical environment). A degradable fiber can be at least one of physically degradable (e.g., loses physical integrity, such that disintegration into smaller materials occurs), chemically degradable (e.g., breakage of bonds or transformation into a different compound, such as cleavage of intramolecular or intermolecular bonds), or dissolvably degradable (e.g., at least part of the material dissolves in the surrounding solution; the dissolution can contribute to or be contributed to by physical degradation).

The fibers can be, for example, at least one of vegetable fibers (e.g., cotton, hemp, jute, flax, ramie, sisal, bagasse), wood fibers (e.g. from tree sources), human or animal fibers, mineral fibers (e.g., asbestos, wollastonite, palygorskite), metallic fibers (e.g., copper, nickel, aluminum), carbon fibers, silicon carbide fibers, glass fibers, fiberglass fibers, cellulose fibers, and polymer fibers. Examples of polymer fibers can include nylon fibers, polyethylene terephthalate fibers, poly(vinyl alcohol) fibers, polyolefin fibers (e.g., polyethylene or polypropylene), acrylic polyester fibers, aromatic polyamide fibers, elastomeric polymer fibers, and polyurethane fibers. In some embodiments, the fibers include at least one of polyamide fibers, polyethylene fibers, polypropylene fibers, and glass fibers (e.g., alkali-resistant glass fibers, or non-alkali-resistant glass fibers).

The fibers can have any suitable length. For example, the fibers can have a length of about 2 mm to about 30 mm, or about 6 mm to about 25 mm, or about 2 mm or less, or about 3, 4, 5, 6, 7, 8, 9, 10, 11, 12, 13, 14, 15, 16, 17, 18, 19, 20, 21, 22, 23, 24, 25, 26, 27, 28, 29, or about 30 mm or more. The fibers can have any suitable diameter. For example, the fibers can have a diameter of about 1 µm to about 0.5 mm, or about 10 µm to about 200 µm, or about 1 µm or less, 2.5, 5, 7.5, 10, 20, 30, 40, 50, 60, 70, 80, 90, 100, 110, 120, 130, 140, 150, 160, 170, 180, 190, 200 µm, 0.3 mm, 0.4 mm, or about 0.5 mm or more.

The fibers can be present in the fluids (proppant-free, proppant-laden, or spacer) in any suitable concentration. For example, the fibers can be about 0.001 wt % to about 99.999 wt % of the fluid, or about 30 wt % to about 99 wt %, or about 50 wt % to about 99 wt %, or about 0.001 wt % or less, or about 0.01 wt %, 0.1, 1, 2, 3, 4, 5, 10, 15, 20, 25, 30, 35, 40, 45, 50, 55, 60, 65, 70, 75, 80, 85, 90, 91, 92, 93, 94, 95, 96, 97, 98, 99, 99.9, 99.99 wt %, or about 99.999 wt % or more.

The fibers can have any suitable density. Fibers having densities near to the densities of the fluid in which they are used (the proppant-free fluid, the proppant-laden fluid, or the spacer fluid) may aid in forming a well-distributed and stable slurry. For example, the fibers can have a density of about 0.5 g/cm$^3$ to about 5 g/cm$^3$, or about 1 g/cm$^3$ to about 4 g/cm$^3$, or about 0.5 g/cm$^3$ or less, or about 0.6 g/cm$^3$, 0.7, 0.8, 0.9, 1, 1.1, 1.2, 1.3, 1.4, 1.5, 1.6, 1.7, 1.8, 1.9, 2.0, 2.2, 2.5, 2.7, 3.0, 3.5, 4, or about 5 g/cm$^3$ or more.

In other embodiments of the present invention, the proppant-free fluid, the proppant-laden fluid, and/or the spacer fluid may further comprise one or more friction reducing agents. Friction reducing agents may among other things, reduce energy losses due to friction in the proppant-laden fluid and proppant-free fluid described herein. Exemplary friction reducing agents may include, but are not limited to, a quaternized aminoalkyl acrylate (e.g., a copolymer of acrylamide and dimethylaminoethyl acrylate quaternized with benzyl chloride), acrylamide, and any combination thereof. Additional exemplary friction reducing agents may include, but are not limited to, copolymers of acrylamide with one or more of the following monomers: acrylic acid, 2-acrylamido-2-methylpropanesulfonic acid, N,N-dimethyl acrylamide, vinylsulfonic acid, N-vinyl acetamide, N-vinyl formamide, and the like. When included, the friction reducing agents may be present in an amount ranging from about 0.01% to about 0.5% by weight of the base fluid of the proppant-free fluid, the proppant-laden fluid, or the spacer fluid, including subsets therebetween (e.g., about 0.05% to about 0.5%, about 0.01% to about 0.1%, or about 0.1% to about 0.5%).

Embodiments disclosed herein include Embodiments A, B, and C:

Embodiment A: Methods comprising: introducing a proppant-free fluid into a wellbore penetrating a subterranean formation to create or enhance one or more fractures; providing binding agent-coated proppant comprising proppant coated with a binding agent; introducing, in alternating order, a proppant-laden fluid and a spacer fluid into one or more of the fractures, wherein the proppant-laden fluid comprises a base fluid and binding agent-coated proppant, and wherein the spacer fluid comprises a base fluid and degradable ultra-low density particulates; forming a proppant pack in the fracture, wherein the proppant pack comprises binding agent-coated proppant and degradable ultra-low density particulates; producing hydrocarbons through the proppant pack; wherein the hydrocarbons degrade the degradable ultra-low density particulates to leave behind particulate-free channels Embodiment B: Methods comprising: introducing a proppant-free fluid into a wellbore penetrating a subterranean formation to create or enhance one or more fractures; providing binding agent-coated proppant comprising proppant coated with a binding agent; introducing, in alternating order, a proppant-laden fluid and a spacer fluid into one or more of the fractures, wherein the proppant-laden fluid comprises a base fluid, the binding agent-coated proppant, and non-degradable ultra-low density particulates, and wherein the spacer fluid comprises a base fluid and degradable ultra-low density particulates; forming a proppant pack in the fracture, wherein the proppant pack comprises binding agent-coated proppant, non-degradable ultra-low density particulates, and degradable ultra-low density particulates; producing hydrocarbons through the proppant pack; wherein the hydrocarbons degrade the degradable ultra-low density particulates to leave behind particulate-free channels Embodiment C: Systems for performing the methods of Embodiment A comprising a pump fluidly connected to a wellbore penetrating a subterranean formation that alternately introduces the proppant-laden fluid and the spacer fluid into the wellbore.

Each of embodiments A, B, and C may have one or more of the following additional elements in any combination:

Element 1: wherein the proppant-laden fluid further comprises non-degradable ultra-low density particulates.

Element 2: wherein the non-degradable ultra-low density particulates comprise non-degradable ultra-low density particulates having a density of about 0.5 g/cc or less and selected from the group consisting of expanded cork, foamed particulates, non-degradable polymer particulates, or composite non-degradable particulates that comprise micro-bubble beads or glass bubbles, and combinations thereof.

Element 3: wherein the non-degradable ultra-low density particulates are present in the proppant-laden fluid in an amount from about 0.5% to about 5% the weight of the proppant.

Element 4: wherein the degradable ultra-low density particulates comprise expanded materials having a density of about 0.1 g/cc or less and selected from the group consisting of expanded polystyrene, polyacrylic particulates, polyamide particulates, polyolefin particulates, and combinations thereof.

Element 5: wherein the degradable ultra-low density particulates are present in the spacer fluid in an amount from about 1% to about 10% the weight of the aqueous base fluid.

Element 6: wherein the step of introducing, in alternating order, a proppant-laden fluid and a spacer fluid into one or more of the fractures comprises five or more steps of introducing the proppant-laden fluid alternated with five or more steps of introducing the spacer fluid.

Element 7: wherein the proppant-free fluid comprises an aqueous fluid as the base fluid and a gelling agent.

Element 8: wherein the gelling agent is a crosslinked polymer.

Element 9: wherein the proppant-laden fluid comprises an aqueous fluid as the base fluid and a gelling agent.

Element 10: wherein the binding agent comprises one selected from the group consisting of: a non-aqueous tackifying agent, an aqueous tackifying agent, a silyl-modified polyamide, a hardenable resin, a cement, and any combination thereof.

By way of non-limiting example, exemplary combinations applicable to A, B, C include, for example, A, B, or C with 1, 2, and 3; A, B, or C with 1, 2, and 4, A, B, or C with 1, 2, 3 and 4, A, B, or C with 1 and 6, and A, B, or C with 1, 2, 3, 4, and 10.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. For example, if the numerical value is "about 5," the range of 4.75 to 5.25 is encompassed. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

To test the degradability of expanded polystyrene in crude oil, 0.2 grams of expanded polystyrene was simply placed into a breaker of 70 mL of crude oil (having API (American Petroleum Institute) gravity of 20) at a temperature of 140° F. (60° C.). As expanded polystyrene is lighter than crude oil, the 0.2 grams simply floated on the oil, no attempt was made to incorporate the expanded polystyrene into the oil and no stirring occurred during the test. Nonetheless, after 0.5 hours visual inspection showed that one-half to two-thirds of the expanded polystyrene had degraded and was no longer visible. After 2 hours all of the expanded polystyrene had degraded and was no longer visible. It is believed that under dynamic conditions (move oil flow or shaking of the beaker), faster degradation would be expected. Similarly, at temperatures above 140° F. (60° C.), faster degradation would be expected.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   introducing a proppant-free fluid into a wellbore penetrating a subterranean formation to create or enhance one or more fractures, wherein the proppant-free fluid comprises a first base fluid;
   introducing, in alternating order, a proppant-laden fluid and a spacer fluid into the one or more fractures, wherein the proppant-laden fluid comprises a second base fluid and a binding agent-coated proppant comprising proppant coated with a binding agent, and, wherein the spacer fluid comprises a third base fluid and degradable ultra-low density particulates, wherein the degradable ultra-low density particulates comprise expanded materials having a density of about 0.1g/cc or less, wherein the degradable ultra-low density particulates are present in the spacer fluid in an amount from about 1% to about 10% the weight of the third base fluid;

forming a proppant pack in the one or more fractures, wherein the proppant pack comprises the binding agent-coated proppant and the degradable ultra-low density particulates; and, producing hydrocarbons through the proppant pack; wherein the hydrocarbons degrade the degradable ultra-low density particulates to leave behind particulate-free channels.

2. The method of claim 1 wherein the proppant-laden fluid further comprises non-degradable ultra-low density particulates.

3. The method of claim 2 wherein the non-degradable ultra-low density particulates comprise non-degradable ultra-low density particulates having a density of about 0.5 g/cc or less and selected from the group consisting of expanded cork, foamed particulates, non-degradable polymer particulates, or composite non-degradable particulates that comprise micro-bubble beads or glass bubbles, and combinations thereof.

4. The method of claim 2 wherein the non-degradable ultra-low density particulates are present in the proppant-laden fluid in an amount from about 0.5% to about 5% the weight of the proppant.

5. The method of claim 1 wherein the degradable ultra-low density particulates comprise expanded materials selected from the group consisting of expanded polystyrene, polyacrylic particulates, polyamide particulates, polyolefin particulates, and combinations thereof.

6. The method of claim 1 wherein the step of introducing, in alternating order, the proppant-laden fluid and the spacer fluid into the one or more fractures comprises five or more steps of introducing the proppant-laden fluid alternated with five or more steps of introducing the spacer fluid.

7. The method of claim 1, wherein the first base fluid comprises an aqueous fluid and a gelling agent.

8. The method of claim 7, wherein the gelling agent is a crosslinked polymer.

9. The method of claim 1, wherein the proppant-laden fluid comprises the second base fluid, wherein the second base fluid comprises an aqueous fluid and a gelling agent.

10. The method of claim 1, wherein the binding agent comprises one selected from the group consisting of: a non-aqueous tackifying agent, an aqueous tackifying agent, a silyl-modified polyamide, a hardenable resin, a cement, and any combination thereof.

11. A system for performing the method of claim 1 comprising:

a pump fluidly connected to a wellbore penetrating a subterranean formation that alternately introduces the proppant-laden fluid and the spacer fluid into the wellbore.

12. The system of claim 11, wherein the non-degradable ultra-low density particulates comprise non-degradable ultra-low density particulates having a density of about 0.5 g/cc or less and selected from the group consisting of expanded cork, foamed particulates, non-degradable polymer particulates, or composite non-degradable particulates that comprise micro-bubble beads or glass bubbles, and combinations thereof, and, wherein the degradable ultra-low density particulates comprise expanded materials having a density of about 0.1 g/cc or less and selected from the group consisting of expanded polystyrene, polyacrylic particulates, polyamide particulates, polyolefin particulates, and combinations thereof.

13. A method comprising:

introducing a proppant-free fluid into a wellbore penetrating a subterranean formation to create or enhance one or more fractures, wherein the proppant-free fluid comprises a first base fluid;

introducing, in alternating order, a proppant-laden fluid and a spacer fluid into the one or more fractures, wherein the proppant-laden fluid comprises a second base fluid, a binding agent-coated proppant comprising proppant coated with a binding agent, and non-degradable ultra-low density particulates, and, wherein the spacer fluid comprises a third base fluid and the degradable ultra-low density particulates, wherein the degradable ultra-low density particulates comprise expanded materials having a density of about 0.1 g/cc or less, wherein the degradable ultra-low density particulates are present in the spacer fluid in an amount from about 1% to about 10% the weight of the third base fluid;

forming a proppant pack in the one or more fractures, wherein the proppant pack comprises the binding agent-coated proppant, the non-degradable ultra-low density particulates, and the degradable ultra-low density particulates; and, producing hydrocarbons through the proppant pack; wherein the hydrocarbons degrade the degradable ultra-low density particulates to leave behind particulate-free channels.

14. The method of claim 13 wherein the non-degradable ultra-low density particulates comprise non-degradable ultra-low density particulates having a density of about 0.5 g/cc or less and selected from the group consisting of expanded cork, foamed particulates, non-degradable polymer particulates, or composite non-degradable particulates that comprise micro-bubble beads or glass bubbles, and combinations thereof.

15. The method of claim 13 wherein the non-degradable ultra-low density particulates are present in the proppant-laden fluid in an amount from about 0.5% to about 5% the weight of the proppant.

16. The method of claim 13 wherein the degradable ultra-low density particulates comprise expanded materials selected from the group consisting of expanded polystyrene, polyacrylic particulates, polyamide particulates, polyolefin particulates, and combinations thereof.

17. The method of claim 13 wherein the step of introducing, in alternating order, the proppant-laden fluid and the spacer fluid into the one or more fractures comprises five or more steps of introducing the proppant-laden fluid alternated with five or more steps of introducing the spacer fluid.

18. The method of claim 13, wherein the binding agent comprises one selected from the group consisting of: a non-aqueous tackifying agent, an aqueous tackifying agent, a silyl-modified polyamide, a hardenable resin, a cement, and any combination thereof.

* * * * *